(12) United States Patent
Swei et al.

(10) Patent No.: US 6,500,493 B2
(45) Date of Patent: Dec. 31, 2002

(54) ELECTROSTATIC DEPOSITION PROCESS

(75) Inventors: Gwo Shin Swei, East Amherst, NY (US); Sylvain Petigny, Tonawanda, NY (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 29 days.

(21) Appl. No.: 09/810,857

(22) Filed: Mar. 16, 2001

(65) Prior Publication Data

US 2001/0049911 A1 Dec. 13, 2001

Related U.S. Application Data

(63) Continuation-in-part of application No. 09/592,151, filed on Jun. 12, 2000, now abandoned, which is a continuation of application No. 09/414,687, filed on Oct. 7, 1999, now abandoned.

(51) Int. Cl.$^7$ ................................................. B05D 1/04
(52) U.S. Cl. ........................ 427/458; 427/475; 427/477; 51/295
(58) Field of Search ............................... 427/458, 459, 427/475, 477, 482; 51/295, 308, 309

(56) References Cited

U.S. PATENT DOCUMENTS

| 3,370,017 | A | * | 2/1968 | Bergna et al. | 252/309 |
| 4,119,712 | A | * | 10/1978 | Goldner et al. | 424/63 |
| 5,011,513 | A | * | 4/1991 | Zador et al. | |
| 5,042,991 | A | * | 8/1991 | Kunz et al. | 51/308 |
| 5,338,323 | A | * | 8/1994 | Yam et al. | 51/307 |
| 5,368,619 | A | * | 11/1994 | Culler | 51/308 |
| 5,432,137 | A | * | 7/1995 | Nishihara et al. | 51/308 |
| 5,505,749 | A | * | 4/1996 | Kirschner et al. | 51/309 |
| 5,611,829 | A | * | 3/1997 | Monroe et al. | 51/309 |
| 5,669,945 | A | * | 9/1997 | Yam | 51/309 |

FOREIGN PATENT DOCUMENTS

EP 493 076 * 7/1992

OTHER PUBLICATIONS

"Electrostatic Powder Coating", J.F. Hughes, PhD, Research Studies Press, Ltd, pp. 29–38 & 103, 1984.*

* cited by examiner

Primary Examiner—Fred J. Parker
(74) Attorney, Agent, or Firm—David Bennett

(57) ABSTRACT

Fine abrasive powders can be made more free-flowing and better adapted to electrostatic upward projection deposition in the production of coated abrasives by the control of the volume resistivity of the powder to a level that is not greater than $10^{14}$ ohms.cm by incorporation of a silica powder.

6 Claims, 10 Drawing Sheets

ELECTROSTATIC DEPOSITION PROCESS

This application continuation-in-part of Ser. No. 09/592,151 filed Jun. 12, 2000 abandoned which is a continuation of Ser. No. 09/414,687 filed Oct. 7, 1999, now abandonded.

BACKGROUND OF THE INVENTION

This invention relates to a process for the deposition of abrasive materials by an electrostatic technique and to formulations that greatly facilitate such a technique.

In the production of coated abrasives by a process in which an abrasive grain is deposited on an uncured or partially cured binder material the most common deposition technique involves electrostatic deposition in which the grain is projected upwards under the influence of an electrostatic field into contact with the binder. These are usually described as UP (for upward projection) processes. The grain is fed from a hopper to a moving belt which is passed through a deposition location, defined by a charged plate located below the moving belt and directly opposite and parallel to a grounded plate located above the moving belt. The substrate on to which the grain is to be deposited follows a path parallel to and above the moving belt as they both pass through the deposition location. The electrostatic field between the charged plate and the grounded plate causes the grain to be projected upwards towards the down-facing surface of the substrate where it adheres to an uncured or partially cured binder coated thereon. Providing the particle size is uniform this usually results in a very uniform deposition of the grain. However if the grain has a tendency to form clumps or if the flow to the surface from which it is projected is uneven, the uniformity of the deposition can be seriously impaired. This problem is particularly serious when very fine particle sizes are involved.

The present invention provides a process for the electrostatic deposition of abrasive particles, even when their size is extremely small. The invention can be used in the feed mechanisms for an UP abrasive grain deposition process or it can be used to deposit a functional powder comprising abrasive grain on the surface of a formulation comprising abrasive grain dispersed within a curable binder in a process such as is described for example in U.S. Pat. No. 5,833,724.

DESCRIPTION OF THE INVENTION

The present invention provides a process for the production of a coated abrasive in which abrasive particles with a grit size smaller than 320 grit are electrostatically deposited on a substrate which comprises treating the abrasive particles prior to deposition with silica powder in an amount sufficient to raise the volume resistivity and the surface resistivity of the abrasive particles by at least fifty percent but to not more than a surface resistivity of $10^{14}$ ohms/square and/or a volume resistivity of $10^{14}$ ohms.cm. Preferably these maximum resistivity values are less than $10^{12}$ ohms/square and ohms.cm respectively.

The surface and volume resistivities are measured using ASTM D4496 which is the standard test method for measuring the "DC Resistance of Conductance of Moderately Conductive Materials" and ASTM D2557 which is the standard test method for measuring the "DC Resistance of Insulating Materials". Achieving an acceptable level according to the invention in one of the parameters, (volume and surface resistivities), will imply that an acceptable level has also been attained in the other such that measurement of either parameter alone is sufficient in practical terms.

It is found that resistivity values can becontrolled to ensure that the treated powder is more readily adapted to UP deposition in coated abrasive applications. However resistivities that are too low or too high are both undesirable. It is therefore necessary to control the resistivity to secure optimum results. Addition of a silica powder is effective to increase the resistivity of the abrasive particles but too large a resistivity creates projectability problems. A salient characteristic of the powder formulations of the invention in which this is achieved is that they are electrostatically projectable while retaining enhanced flowability.

The desired resistivity values can be obtained for example by adding to the abrasive particles a suitable silica powder additive the amount of which will vary with the additive. In general however it is possible to secure target resistivity properties for the powders of the invention by the addition of from 0.02 to 5% by weight based on the weight of the formulation. The preferred amount of silica is from 0.05 to 3%, such as from 0.1 to 2%, based on the formulation weight.

The silica powder preferably has a particle size no greater than that of the abrasive particles.

The silica can be any of the available powdered silica products such as fumed or precipitated silicas. While silica is inherently somewhat resistant to charge-driven clumping, some silicas such as fumed silica have highly porous particle structures leading to exaggerated surface areas and with such silicas a tendency to form clumps is sometimes encountered. Where such problems are encountered with fumed silica, it can be used effectively after treatment with an additive such as hexamethyldisilazane to increase the hydrophobicity of the silica surface and minimize the tendency to agglomerate. Such treatment is frequently used by commercial suppliers of fumed silica. Even if some agglomeration of commercial fumed silica powder does occur, the forces involved are much attenuated and can readily be broken down by shear stress.

Suitable silicas which can be used with advantage include:

FG-SP FLOW-GARD® with particle size of 25 microns and a BET surface area of 220 $m^2$/gm;

FG-AB® with particle size of 20 microns and a BET surface area of 130 $m^2$/gm;

HI-SIL® T-600 with particle size of 2.0 microns and a BET surface area of 170 $m^2$/gm; and HI-SIL® T-152 with particle size of 1.4 micron and a BET surface area of 150 $m^2$/gm; (all these are available from PPG Corporation); and CAB-O-SIL® TS-530 which has a particle size of 0.2 micron, a surface area of 220 $m^2$/gm and has been given a surface treatment of hexamethyldisilazane. This product is available from Cabot Corporation.

The abrasive particles can be for example fused or sintered alumina, silicon carbide, cubic boron nitride, diamond or fused alumina/zirconia. The most commonly used abrasives are however based on alumina or silicon carbide. The abrasive particle size that can be used corresponds to 320 grit or finer but the problem is usually encountered in greatest severity at grit sizes of P1200 and finer. This corresponds to average particle sizes of about 25 microns and finer.

The formulation can also comprise, in addition to the abrasive particles and silica powder, functional additives that convey specific properties to the abrasive product such as surface lubrication, anti-static properties, enhanced grinding capabilities and so on. Such additives are included along with and in intimate mixture with the abrasive particles. These too preferably have particle sizes equal to or smaller than the abrasive particle with which they are mixed. The amount of functional additive that can be present can be for example from 5 to 75%, and preferably from 25 to 60% and most preferably from 30 to 50% of the total weight of abrasive plus additive.

Besides having resistivity levels consistent with the invention it is also found that the abrasive powders of the invention are in general much less susceptible to variations in moisture in the atmosphere or on the grain. With some grains, notably alumina-based grains, the relative humidity surrounding the UP deposition apparatus very significantly affects the efficiency by which the abrasive particles are projected. The abrasive particle powders of the invention are however much more resistant to humidity variations, thereby providing a significant extra benefit from the practice of the invention.

When referring to the abrasive particles the size expressed in terms of a CAMI grading process defines an average particle size which corresponds to a specific number of microns. When referring to silica or other powdered additives the particle size is expressed in microns and refers to a volume average particle size as determined by, for example, a Horiba particle size analyzer.

DESCRIPTION OF THE PREFERRED EMBODIMENTS

The invention is now illustrated by evaluating the properties of a number of formulations and the abrasive performance of a coated abrasive incorporating one such formulation. The Examples are therefore for demonstrative purposes and do not imply any essential limitation on the invention or the scope of its utility in all circumstances.

EXAMPLE 1

In this Example the objective is to show the impact of the addition of a silica additive on the resistivity of the resulting abrasive grain powder. In all cases the additive was a fumed silica powder with a hexamethyldisilazane treatment This silica is available from Cabot Corporation under the designation "TS 530".

Two sets of tests were performed. The first was carried out on aluminum oxide abrasive powders available from Treibacher AG under the designations:

BFRPL P600 (FEPA P-grading with 25.8 micron average particle size);
FRPL P800 (21.8 micron average particle size); and
FRPL P1500 (12.6 micron average particle size).

The second set of tests was carried on silicon carbide abrasive powders available from Saint-Gobain Industrial Ceramics Inc. under the designations:

E299 400 (ANSI grading 22.1 microns);
E299 600 (ANSI grading 14.5 micron); and
E599 P1500 (FEPA P-grading, 12.6 micron).

Figure 1:
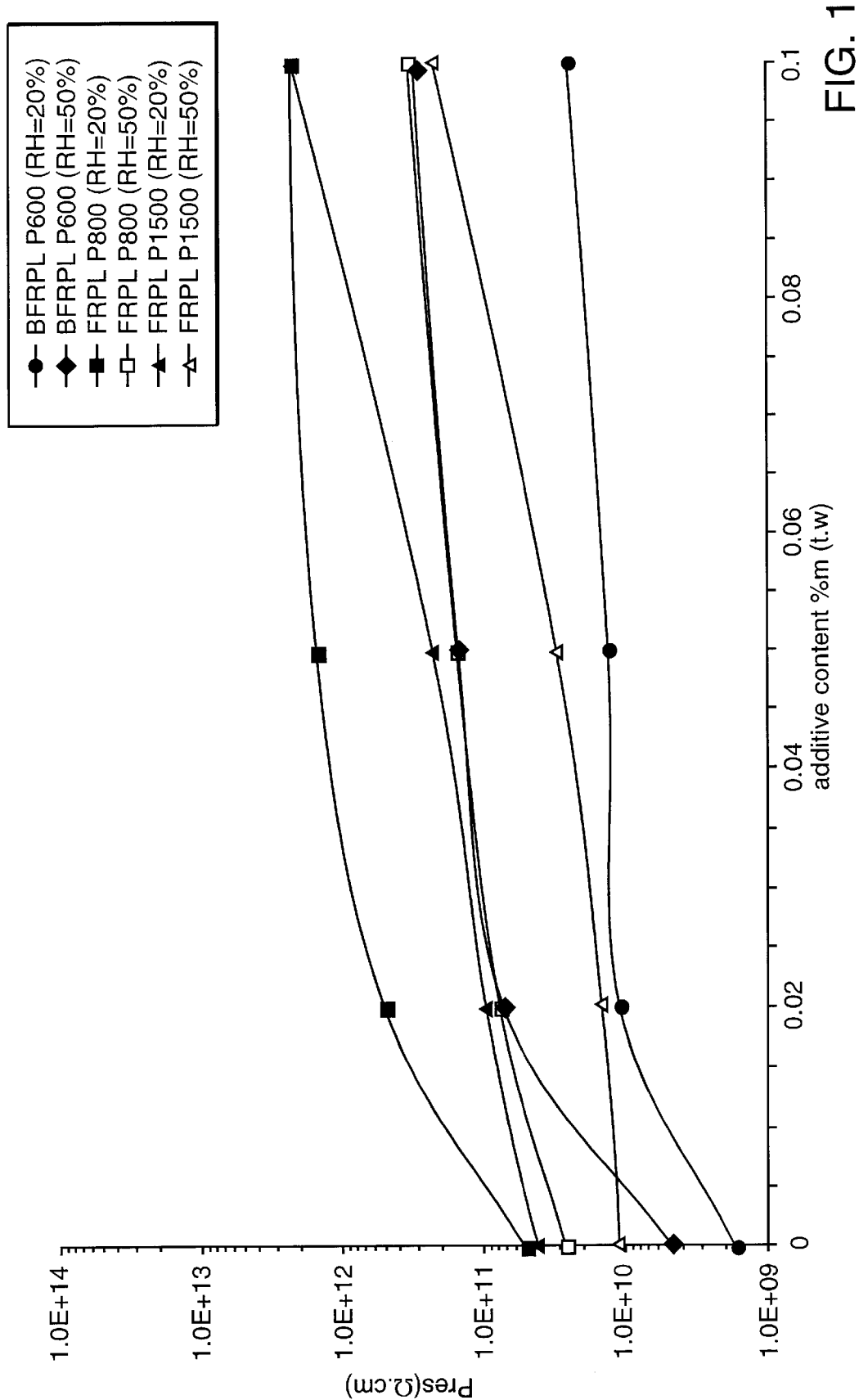
FIG. 1 is a graph showing the effect of additive weight on volume resistivity of the resultant abrasive powder for three different aluminum oxide abrasive grains under two different relative humidity conditions.
Figure 2:
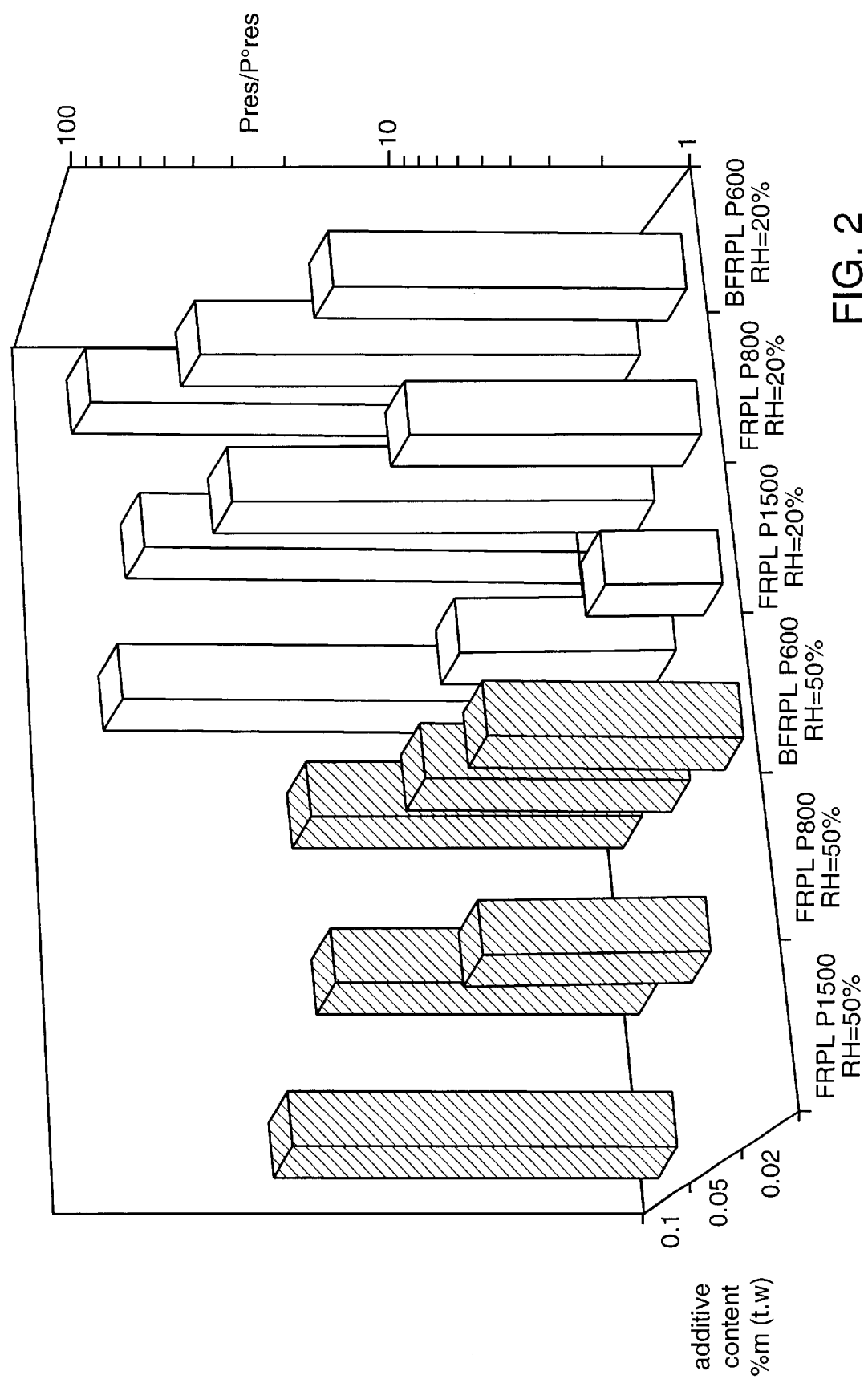
FIG. 2 presents the data from FIG. 5 in bar chart form.
Figure 3:
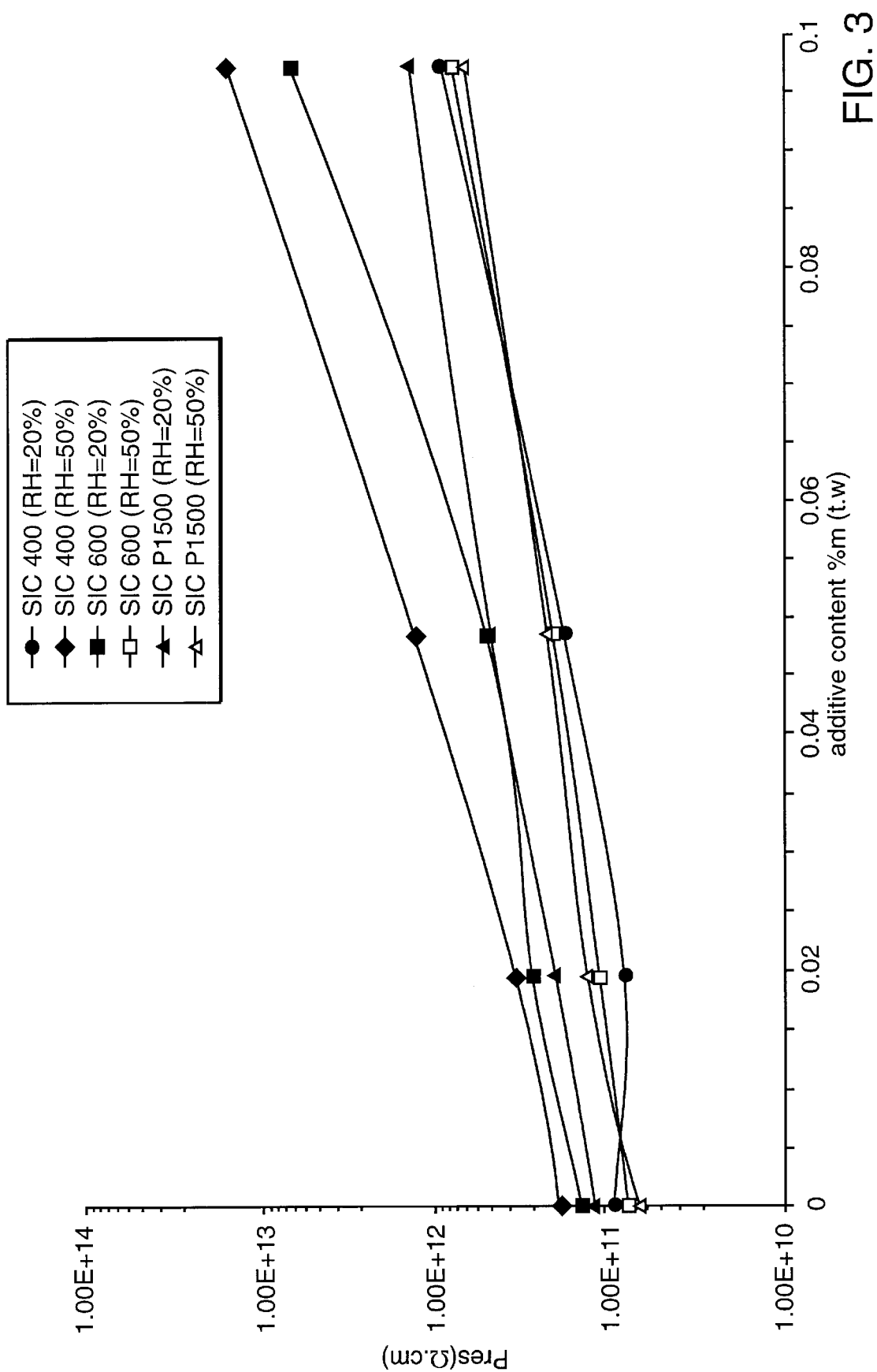
FIGS. 3 and 4 are similar to FIGS. 1 and 2 with the difference that the data collected refers to silicon carbide abrasive grain.
Figure 4:
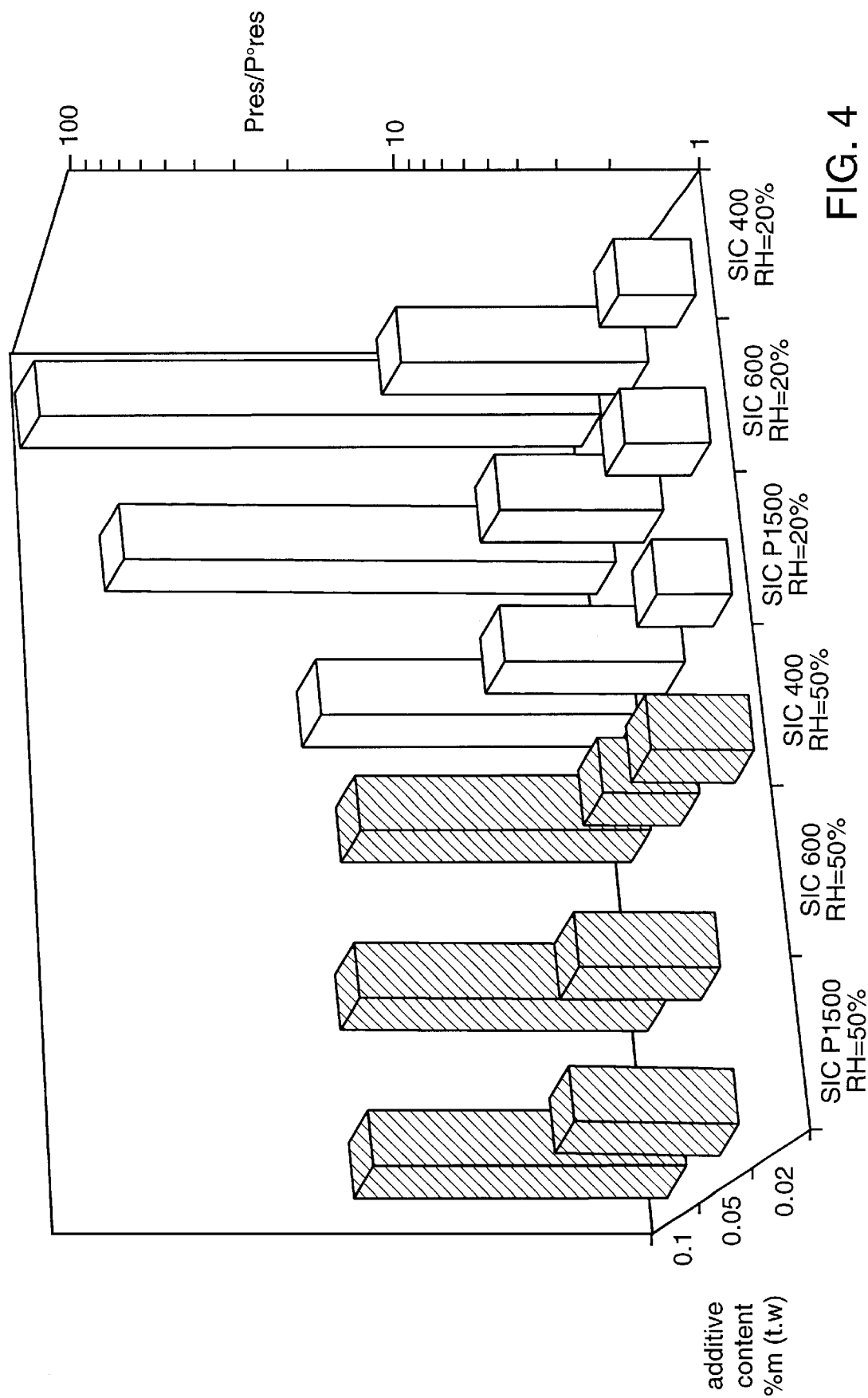

In each case the powders were given silica powder additions at a number of levels and the volume resistivity was measured at relative humidity levels of 20% and 50%. The results of the evaluations are shown in FIGS. 1–4. In FIGS. 1 and 3 the variation of resistivity with percent additive is tracked for the aluminum oxide and silicon carbide grains respectively. FIGS. 2 and 4 present the data in FIGS. 1 and 3 respectively in bar chart form as a comparison with the resistivity measurement for the grain in the absence of any modifier. To do this the resistivity value reported in the graph is divided by the resistivity of the identical unmodified abrasive grain at the same relative humidity. This shows more clearly the dramatic improvement in resistivity upon addition of relatively modest amounts of the silica additive.

Figure 5:
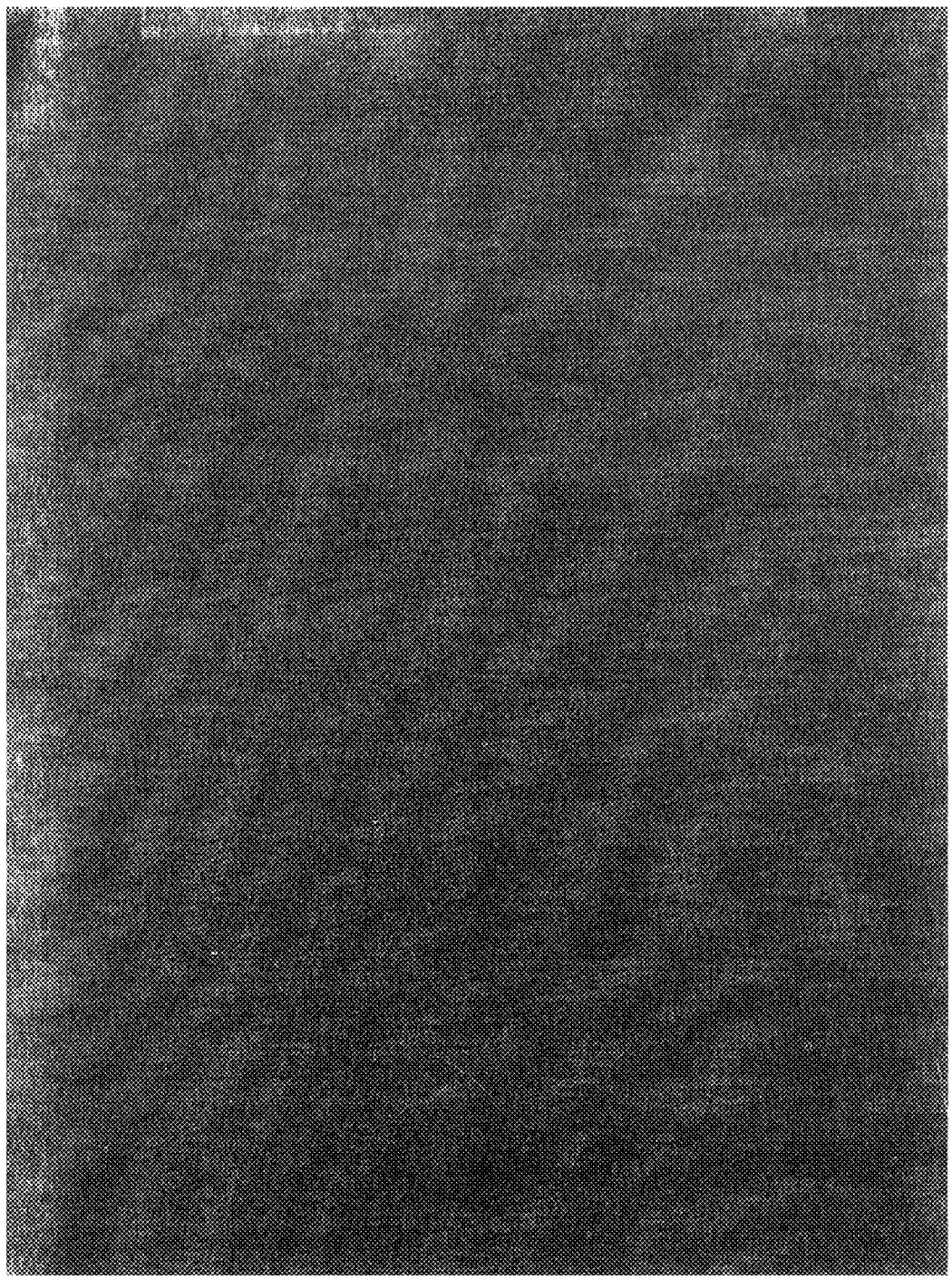
FIGS. 5–8 are photographs of the surfaces of coated abrasives prepared as described in Example 1.
Figure 6:
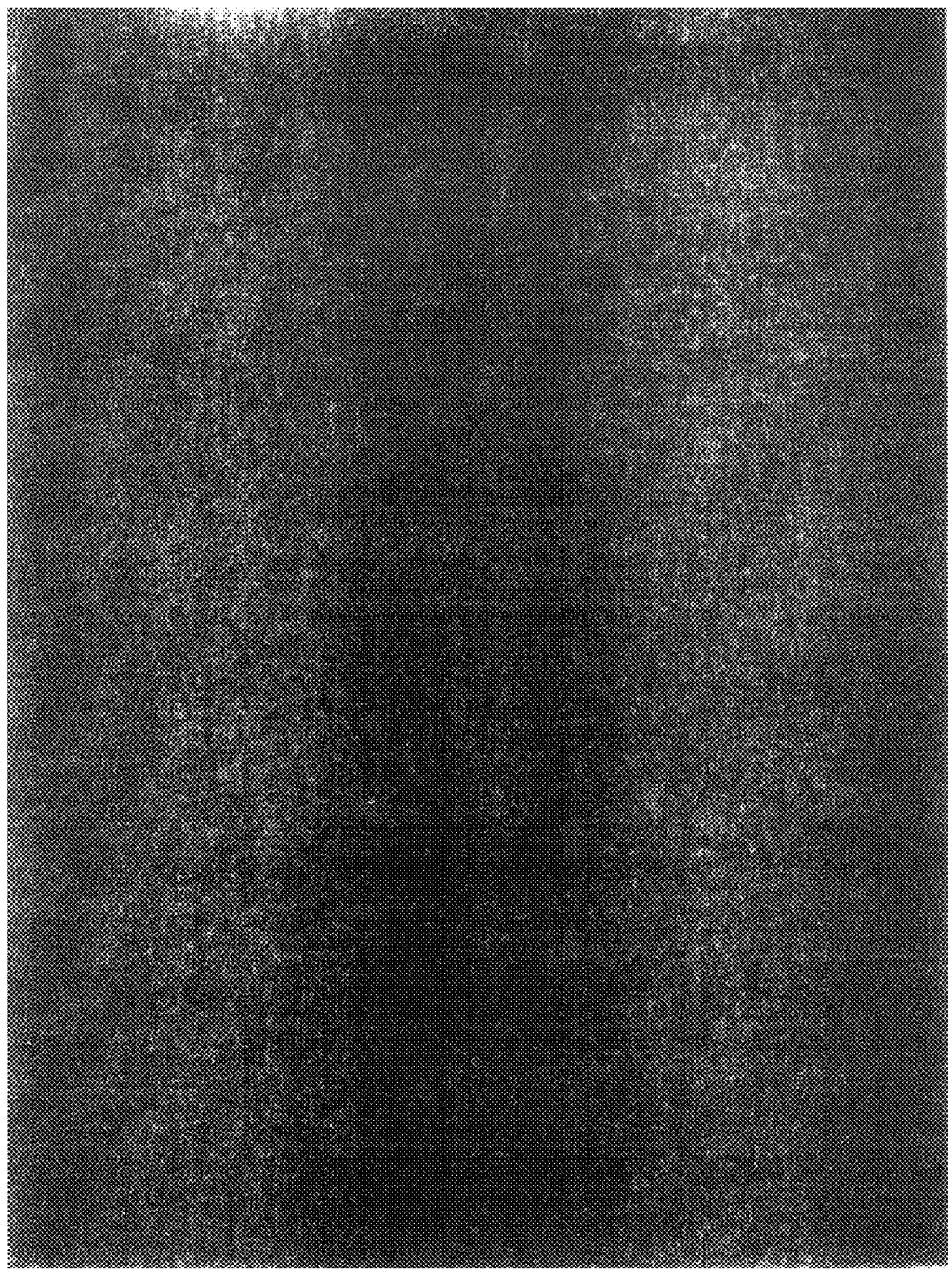
Figure 7:
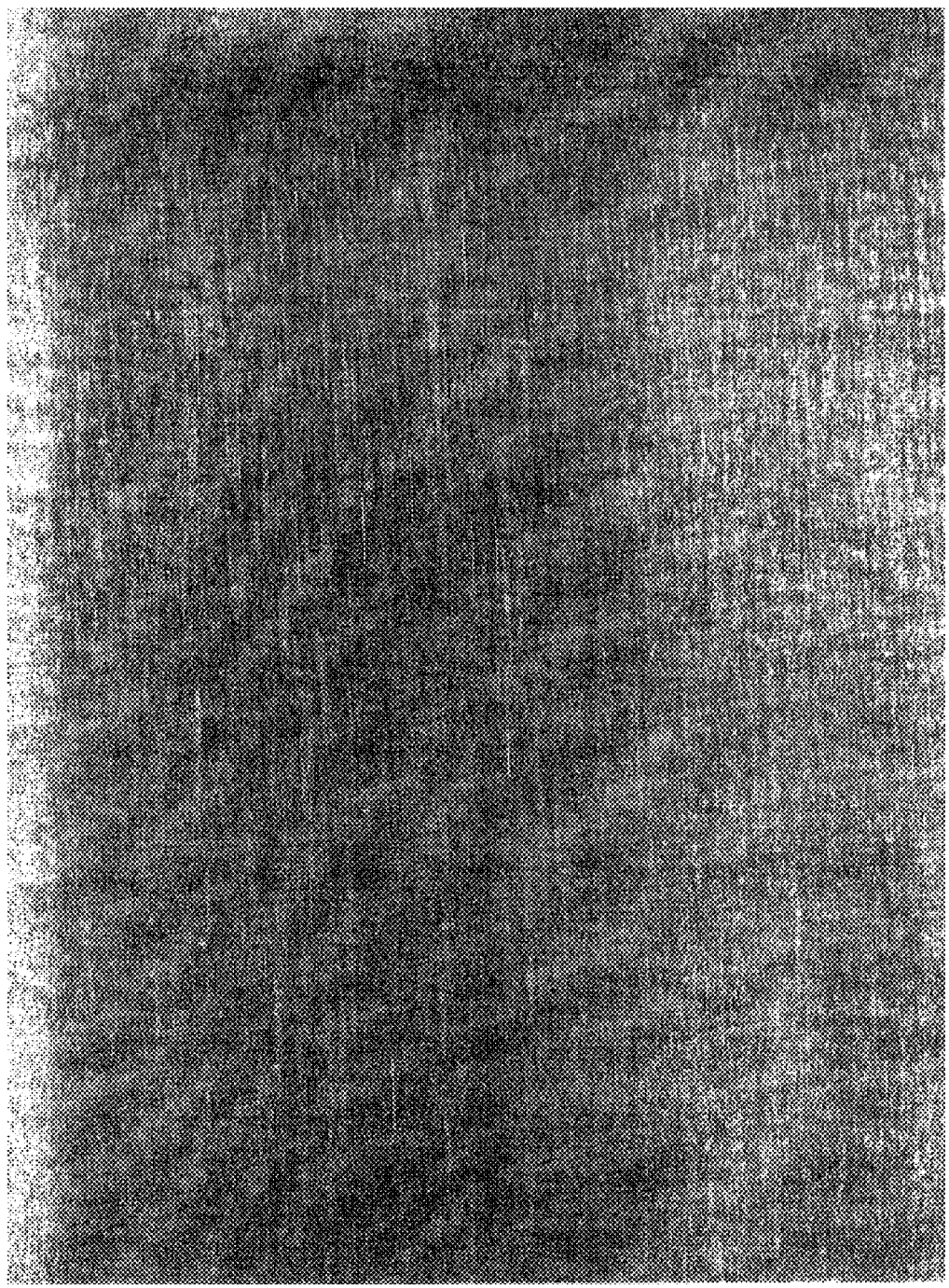
Figure 8:
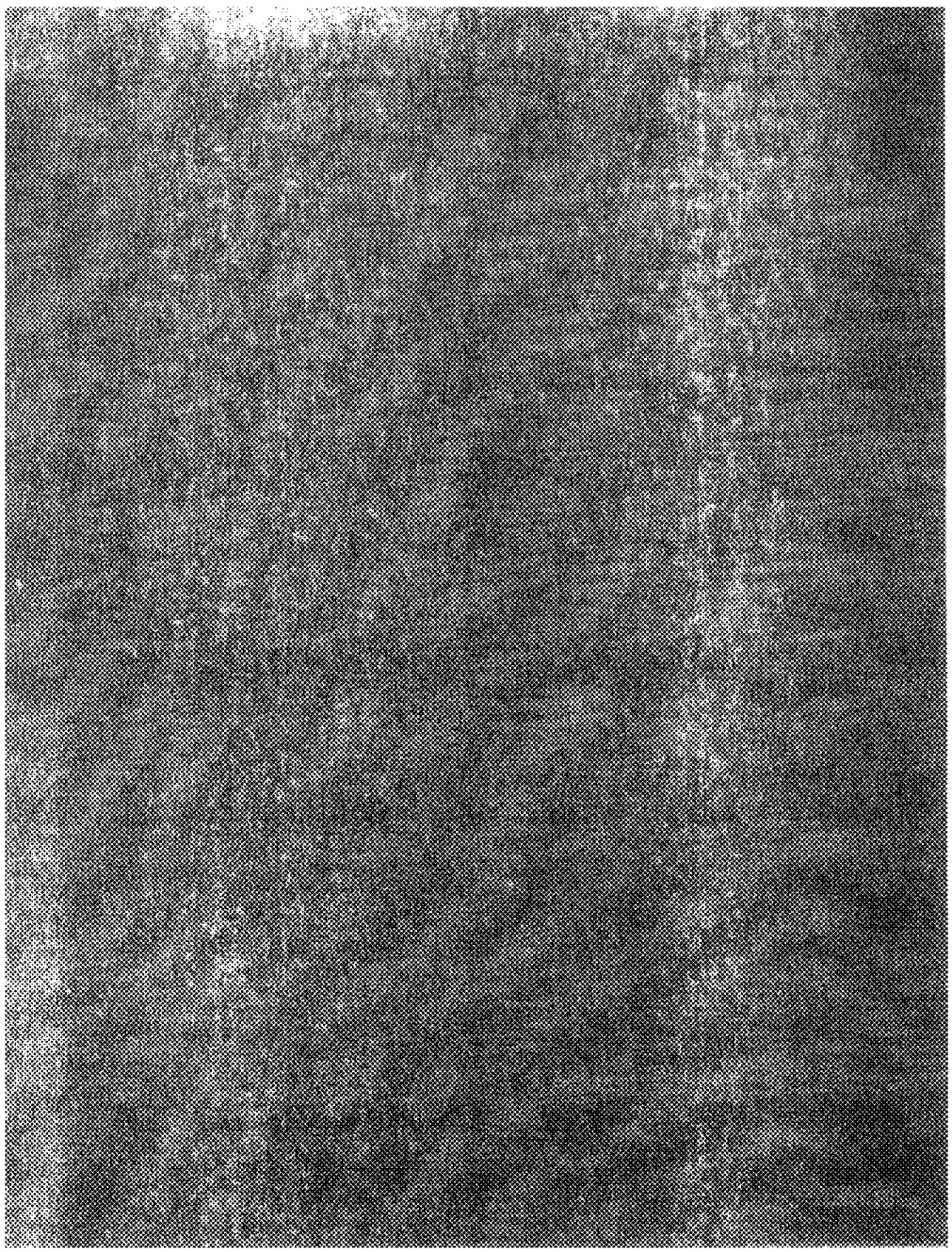

To demonstrate the process of the invention, two separate coated abrasive production runs were set up. In each case the same deposition conditions were used with 600 grit silicon carbide abrasive grit being deposited on a substrate having a phenolic resin maker coat deposited thereon. The grain technique used UP deposition on to the maker coat layer from a tray of the grain. The only difference is that in the process according to the invention the grain had received a coating of 0.05% by weight of TS530 silica. This was one of the products used to generate the data in FIGS. 3 and 4. The comparative process used the same grain but without the silica coating and the identical deposition conditions. FIGS. 5 to 8 show photographs of the surfaces of the coated abrasive products. FIG. 5 shows the result of the process of the invention. It shows an essentially uniform deposition pattern. FIGS. 6, 7 and 8 shows different parts of the product obtained by the prior art, (comparative), process. In FIG. 6 there are heavily and lightly coated areas clearly visible. In FIG. 7 the lack of uniformity is in the form of streaks and in FIG. 8 the lack of uniformity is in the form of a mottled appearance. This lack of uniformity will clearly translate into lack of uniformity in grinding performance.

Figure 9:
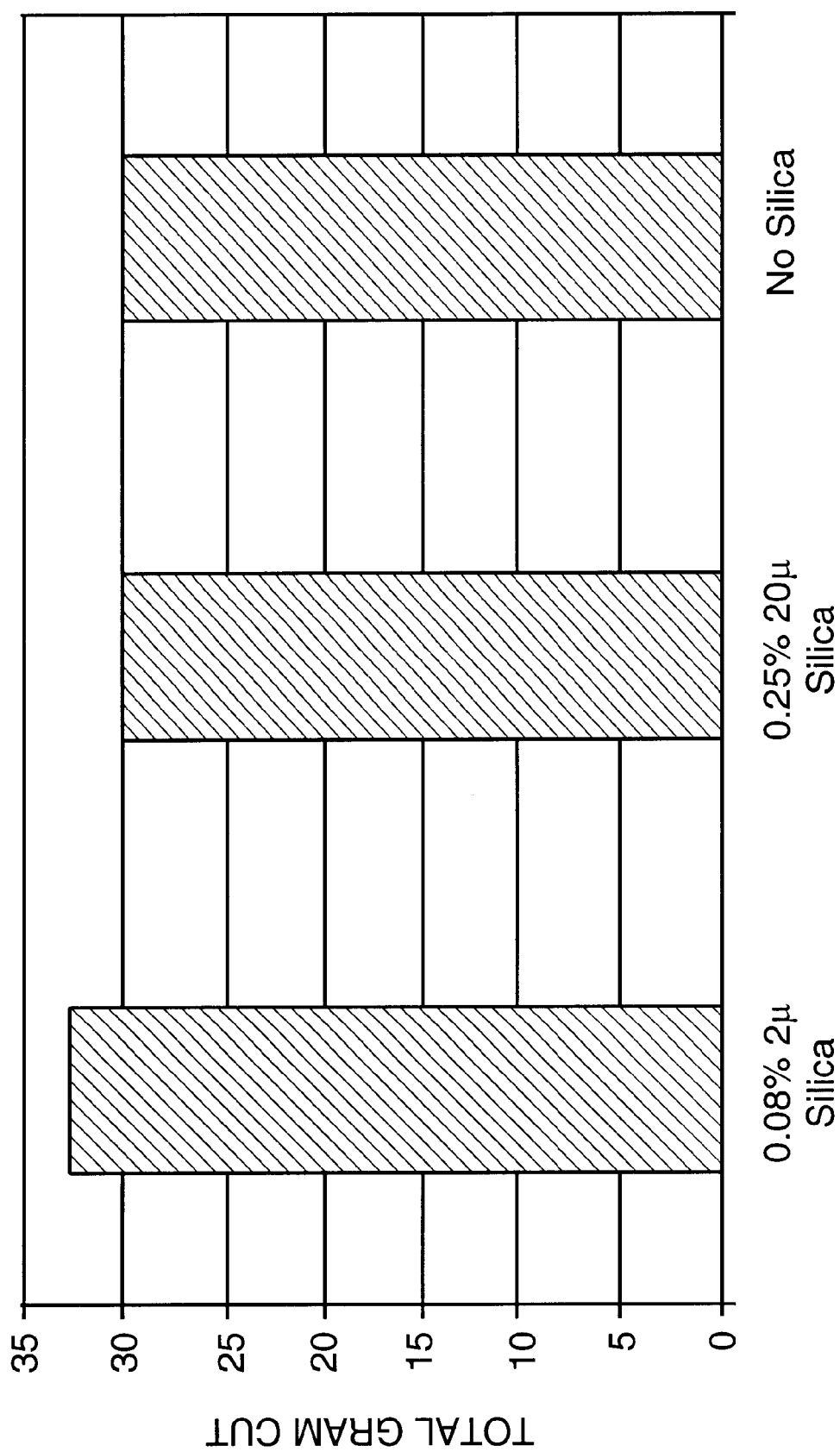
FIG. 9 is bar graph showing the grinding results obtained using the products made according to Example 1.

The two coated abrasives were then evaluated on a rubbing machine (from Stuhr GmbH, Model 4000), using a stroke rate of 3100 sfpm and a stroke length of ¾ inch. A cast acrylic workpiece was forced against a 9 inch by 11 inch sheet of the coated abrasive under a pressure of 75 psi. Six two minute grinding periods were used with a minute of rest between each period. The amount of the workpiece removed at the end of the run was measured and the results appear in FIG. 9 As is clear from this evaluation the presence of the silica and the resulting greater uniformity of surface deposition resulted in much better material removal. The same evaluation was carried out using coated abrasives made using 400 grit silicon carbide but otherwise the same formulations and procedures. These results are also shown on FIG. 9.

EXAMPLE 2

In this Example the grinding performance of a coated abrasive with an engineered surface was evaluated with and without the silica additive. The coated abrasive substrate was obtained by depositing a formulation comprising an alumina abrasive grit dispersed in a UV-curable acrylate binder resin, and then applying to the surface of the deposited formulation a layer of a powder comprising a 2:1 weight ratio of P1200 alumina abrasive particles and potassium fluoroborate particles. A repeating pattern was embossed on the formulation and the resin binder component was cured.

Three samples were prepared that were identical except that the powder layer deposited on the uncured surface of two of the abrasive/binder resin formulations contained silica and the third had none.

The samples were then tested for abrasive performance on a ring of 304 stainless steel with a pressure of 16 psi, (applied to the back of the coated abrasive using a Matchless-B contact wheel), and a relative movement speed of 5000 sfpm.

The first formulation according to the invention comprised a precipitated silica with a BET surface area of 170 $m^2/gm$ and an average particle size of about 2 microns in an amount of 0.08% by weight based on the powder weight. The second contained 0.25% by weight, based on the powder weight of a 20 micron precipitated silica available from PPG Corporation under the trademark FLOW-GARD® AB. The third contained no silica.

Figure 10:
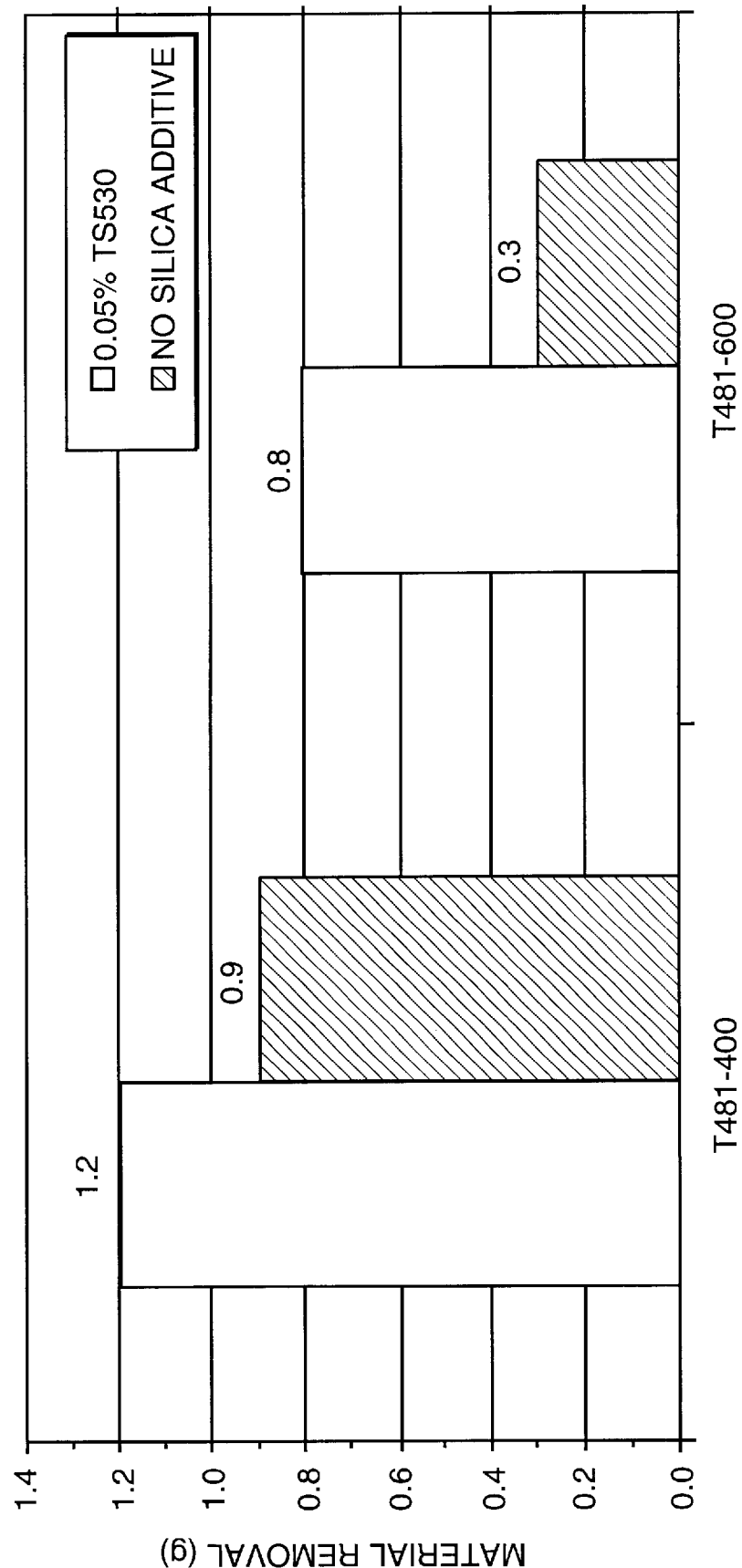
FIG. 10 is a bar graph showing the grinding results obtained in Example

The results of the grinding test are shown in FIG. 10. As will be seen, the effect of the grinding results of the incorporation of silica is very minor and at very low concentrations may even be beneficial.

What is claimed is:

1. A process for the preparation of a coated abrasive which comprises;
  a) depositing on abrasive particles, having measured surface and volume resistivity values and a particle size finer than 320 grit, particles of a silica powder in an amount sufficient to raise the volume resistivity and the surface resistivity of the abrasive particles by at least fifty percent relative to these parameters prior to deposition of the silica powder particles but to not more than a surface resistivity of $10^{14}$ ohms/square and/or a volume resistivity of $10^{14}$ ohms.cm; and
  b) electrostatically depositing the abrasive particles from a) on a substrate such that they become bonded thereto.

2. A process according to claim 1 in which the amount of silica added is sufficient to give the abrasive particles surface and volume resistivity values of less than $10^{12}$ ohms/square and $10^{12}$ ohms.cm respectively.

3. A process according to claim 1 in which the amount of silica powder added represents from 0.02 to 5% of the total combined weight of the abrasive and the silica.

4. A process according to claim 1 in which the silica is selected from the group consisting of precipitated silica; fumed silica; fumed silica treated to provide silica particles with a hydrophobic surface; and mixtures thereof.

5. A process according to claim 1 in which the silica particles have an average size that is no larger than that of the abrasive particles.

6. A process according to claim 1 in which the abrasive particles have a size that is not greater than P1200 grit.

* * * * *